(12) United States Patent
Tratar et al.

(10) Patent No.: US 6,394,348 B1
(45) Date of Patent: May 28, 2002

(54) APPARATUS FOR POSITIONING MAGNETICALLY CODED SUBSTRATE RELATIVE TO A MAGNETIC READ HEAD

(75) Inventors: David B. Tratar, Dearborn; Johan P. Bakker, Brighton, both of MI (US)

(73) Assignee: Unisys Corporation, Blue Bell, PA (US)

( * ) Notice: Subject to any disclaimer, the term of this patent is extended or adjusted under 35 U.S.C. 154(b) by 0 days.

(21) Appl. No.: 09/459,554

(22) Filed: Dec. 13, 1999

(51) Int. Cl.[7] .................................................. G06K 7/08
(52) U.S. Cl. ...................................... 235/449; 235/453
(58) Field of Search ................................. 235/449, 453, 235/454, 459, 493; 360/128, 129

(56) References Cited

U.S. PATENT DOCUMENTS

| | | | | |
|---|---|---|---|---|
| 5,003,423 A | * | 3/1991 | Imamura et al. | 360/125 |
| 5,566,378 A | * | 10/1996 | Nagasawa | 360/77.16 |
| 5,598,310 A | * | 1/1997 | Dale et al. | 360/130.32 |
| 5,698,832 A | * | 12/1997 | Smeya et al. | 235/449 |

FOREIGN PATENT DOCUMENTS

| | | | | |
|---|---|---|---|---|
| EP | 0383588 | * | 8/1990 | G11B/5/52 |
| EP | 0615230 | * | 9/1994 | G11B/5/48 |

* cited by examiner

*Primary Examiner*—Michael G. Lee
*Assistant Examiner*—Daniel St. Cyr
(74) *Attorney, Agent, or Firm*—Brooks & Kushman P.C.; Mark T. Starr; Lise A. Rode

(57) ABSTRACT

An apparatus for positioning magnetically coded substrate relative to a read head that optimally positions the substrate against the read head. A beam arm is sized and formed to transmit a force to a contact head located at a first end of the beam arm. The contact head is formed by a recessed wedge defined by a lead-in and lead-out, both making contact with the substrate, transmitting a force at first location and second location of substrate, thereby flexing the substrate about the read head. The contact head maintains the position of the substrate in the active reading area of the read head, thus maximizing reading capability. Moreover, the apparatus is formed from a material entirely non-magnetic, having a low coefficient of friction, flexibility and a good resistance to wear.

6 Claims, 5 Drawing Sheets

APPARATUS FOR POSITIONING MAGNETICALLY CODED SUBSTRATE RELATIVE TO A MAGNETIC READ HEAD

BACKGROUND OF THE INVENTION

1. Field of the Invention

This invention relates to positioning and constraining a substrate relative to a read head, more particularly, to an apparatus for positioning magnetically coded substrates relative to a magnetic read head.

2. Description of Related Art

Magnetic encoding and reading provide an electronic manner in which data is obtained. Magnetically encoded characters are printed on a flexible substrate such as paper or plastic. The magnetically encoded substrate is designed to pass across a read head. The magnetic characters are shaped and positioned on the substrate to create variations of magnetic flux that the read head senses, and the magnetic flux is transformed into varying electrical current. The electrical current is provided to electronic conditioning circuitry that permits the characters to be read.

The magnetically encoded substrate should optimally make correct and continuous contact with the magnetic read head. The active reading area of the magnetic read head is a vertical air-gap between two sets of laminated cores. The air gap is approximately four thousandths of an inch or 0.1 millimeters in width. This air gap is the primary location in which magnetic flux variations are generated. The air gap, however, has an edge in which boundary effects occur. Consequently, the substrate should remain in intimate contact with the read head for a distance before and after the air gap.

The contact between the substrate and read head is made as the flexible substrate is contoured around the read head, known in the art as "wrapping." The amount of "wrap," or the portion of the substrate that contours around the read head, is described as a number of degrees. If the "wrap" includes too great of an angle, then the substrate is substantially deformed and an unnecessary rotational couple occurs, causing excessive skew and buckle to the substrate. If the "wrap" includes an insufficient angle, then a loss in signal strength and quality occurs.

Various combinations of rollers, "slipper" springs, flexible elements and similar devices traditionally have been used to mitigate this contact problem between the substrate and the read head.

A further issue regarding contact between the substrate and read head relates to the material from which a device that causes the substrate to wrap about the read head is made. The device is preferably made of materials that are paramagnetic and exhibit no independent magnetic properties. The material of the device must also be able to withstand the constant friction of the substrate material.

The previous use of a paramagnetic stainless-steel alloy, known under the trademark of DYNAVAR®, was conforming, elastic, and compliant creating an extremely highly-finished, and smooth surface with low friction. The wear characteristics of the paramagnetic stainless-steel alloy, however, required regular replacement of the read head apparatus as the continual substrate friction causes degradation.

SUMMARY OF THE INVENTION

The present invention is to provide an apparatus for positioning a magnetically coded substrate relative to a magnetic read head. In accordance with the teachings of the present invention a magnetically coded substrate positioning apparatus is disclosed. A beam arm is attached at one end to a housing. A contact head is located at the second end of the beam arm. The contact head has an outer extremity and an inner extremity. A recessed wedge formed by a lead-in and a lead-out is located at the inner extremity. The recessed wedge contacts a substrate in two locations, one point of contact occurs between the lead-in and the substrate, and the other point of contact occurs between the lead-out and the substrate. At these points of contact, a force is applied to the substrate causing the substrate located between said lead-in and lead-out to continuously contact an apex of the read head for a short distance before and after an active reading area of the read head.

DESCRIPTION OF THE PREFERRED EMBODIMENTS

The reading of magnetically-encoded characters on a substrate passed across a read head requires the substrate to be constrained relative to the magnetic read head. The substrate is positioned against the read head by an apparatus. Such a head pressure device 2 is shown in FIGS. 1, 2, 3, 4, and 5.

Figure 1:
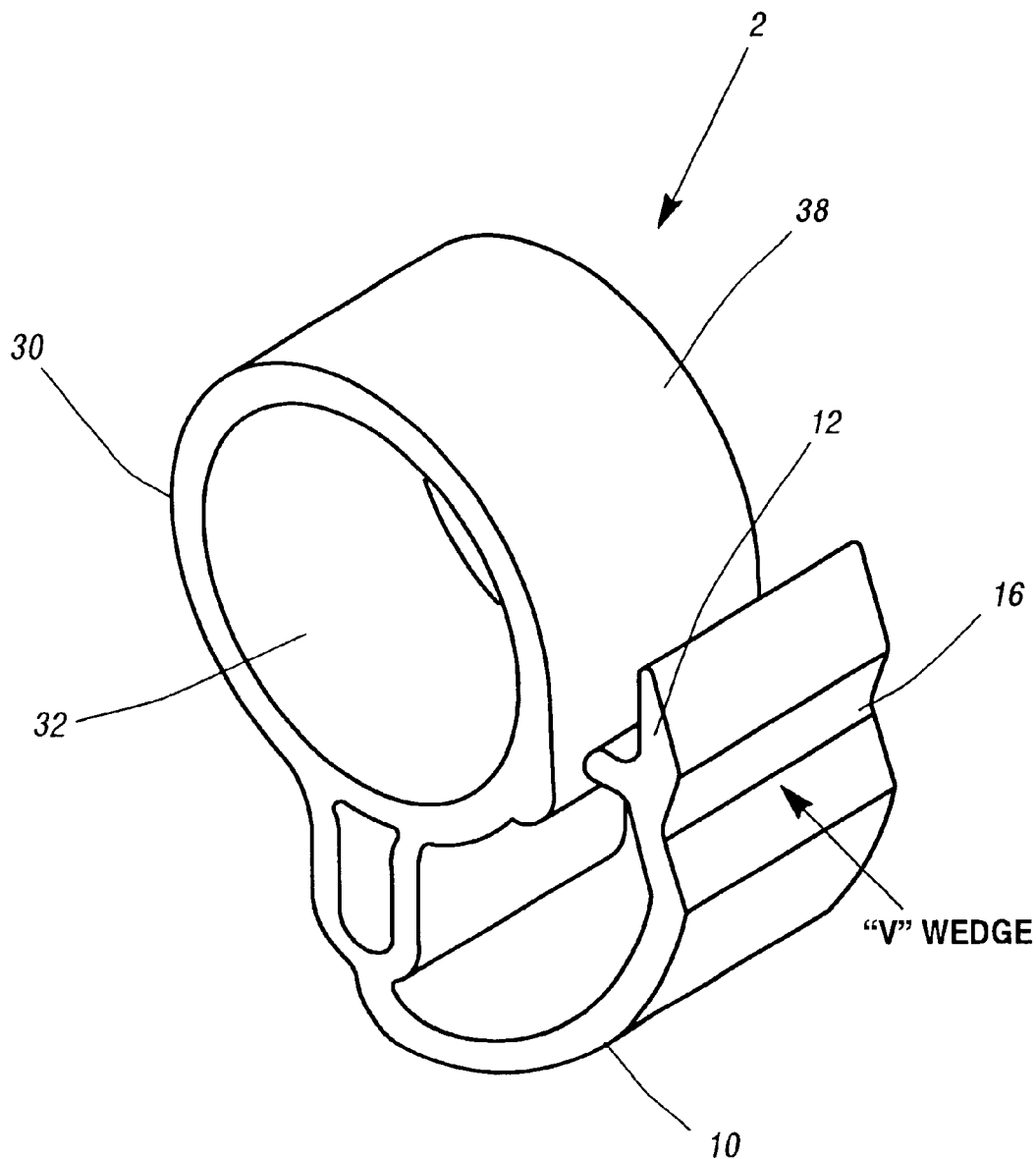
FIG. 1 is a first perspective view showing a head pressure device of the preferred embodiment.
Figure 2:
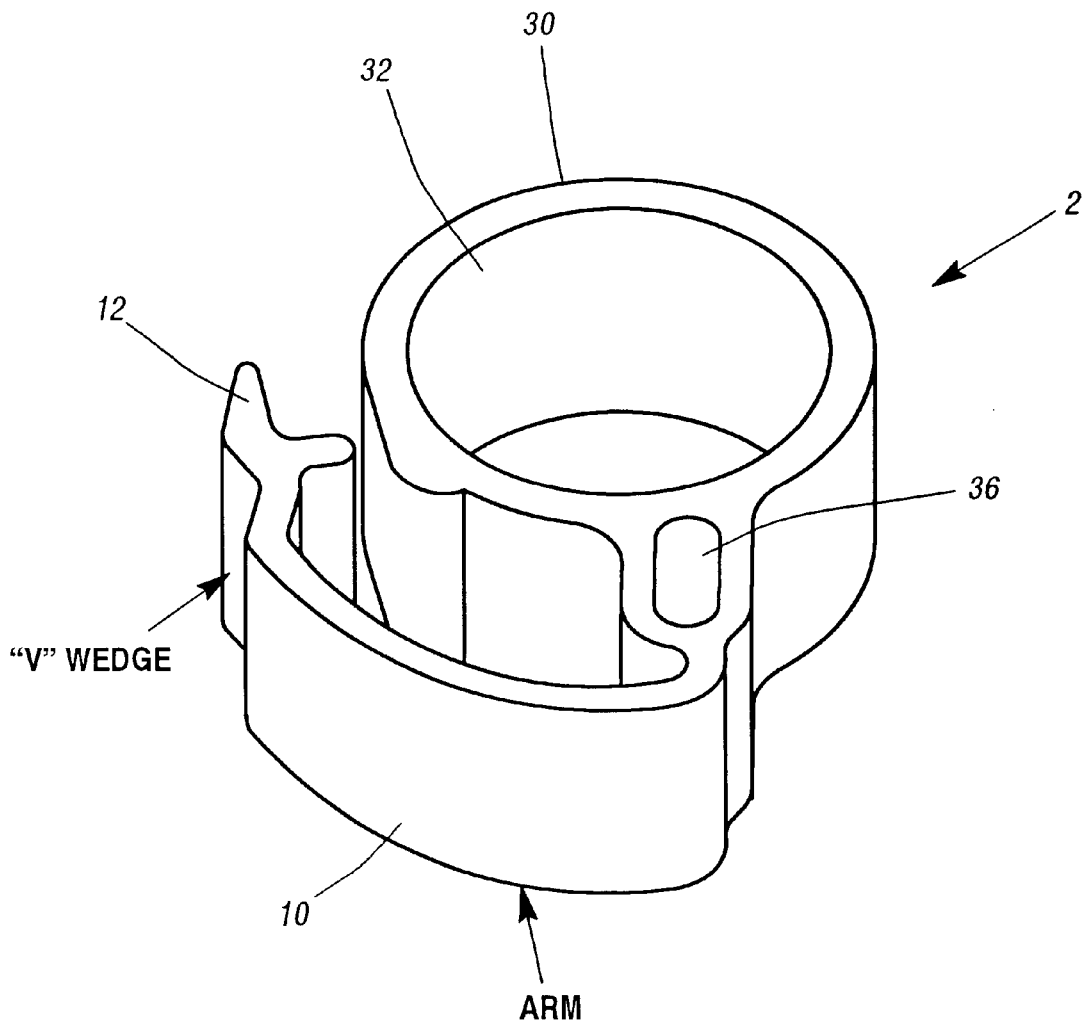
FIG. 2 is a second perspective view showing a head pressure device of the preferred embodiment.

FIGS. 1 and 2 best show head pressure device 2. Beam arm 10 is attached to outer face 38 of cylindrical housing 30. Beam arm 10 is preferably a curved planar beam shaped to provide a force at outer extremity 14. Beam arm 10 is preferably sized and formed according to calculations determined by finite element analysis or a similar analysis. The preferred embodiment of the present invention shows outer extremity 14 having a tab 15 at outer extremity 14.

Figure 3:
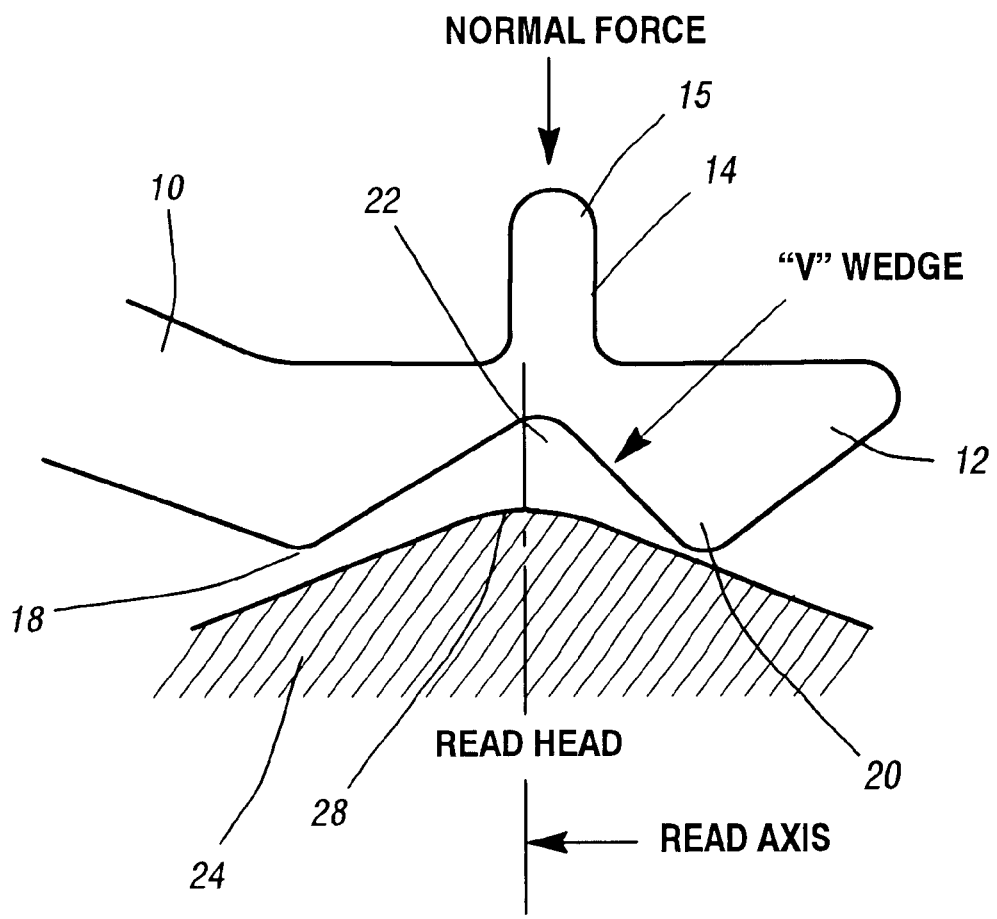
FIG. 3 is cross-sectional view of a beam arm of the preferred embodiment positioned with respect to a read head.
Figure 4:
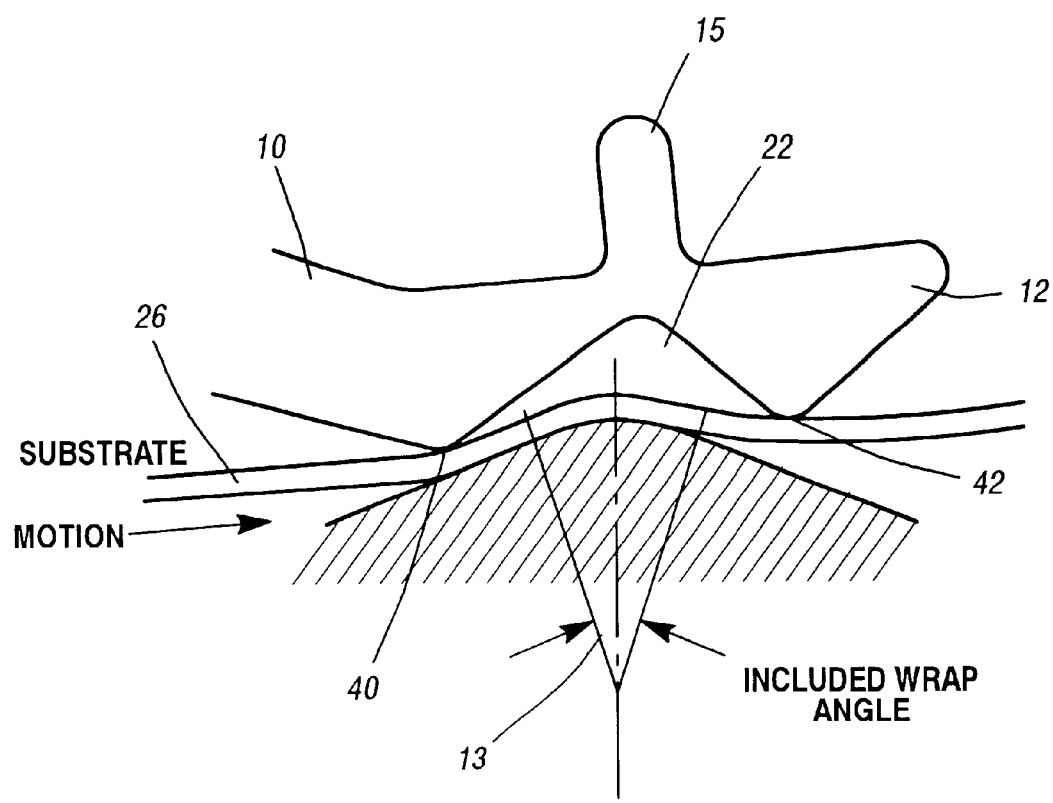
FIG. 4 is a cross-sectional view showing a beam arm applying a force to the substrate so that the substrate has a "wrap" across the read head.

FIGS. 3 and 4 best show contact head 12 of beam arm 10. Contact head 12 has an inner extremity 16. Inner extremity 16 has recessed wedge 22 defined by lead-in 18 and lead-out 20, whereby lead-in 18 and lead-out 20 transmit forces to first location 40 and second location 42 of substrate 26, permitting substrate 26 to form an angular wrap position about contact apex 28 of read head 24. Beam arm 10, in the preferred embodiment, transfers an optimal force of 70 grams or 2.5 oz. normal to the plane in which contact apex 28 of read head 24 is positioned against substrate 26 so as to minimally deform substrate 26. In the preferred embodiment, the forces applied at lead-in 18 and lead-out 20 result in a deformation of substrate 26 at approximately a 4 degree included angle 13 about apex 28 of read head 24.

Head pressure device 2 is preferably one-piece made by an injection-molding process using a thermoplastic material. The thermoplastic material should preferably be non-magnetic and have properties such as an extremely low coefficient of friction, resistance to wear, excellent tensile strength and low "creep" characteristics so as to permit formation of flexible and tensile members with high accuracy and consistency.

In the preferred embodiment head pressure device 2 is made from a thermoplastic exhibiting the above mentioned properties, known under the trademark of CARILON®, a product of ROYAL DUTCH SHELL NV.

Figure 5:
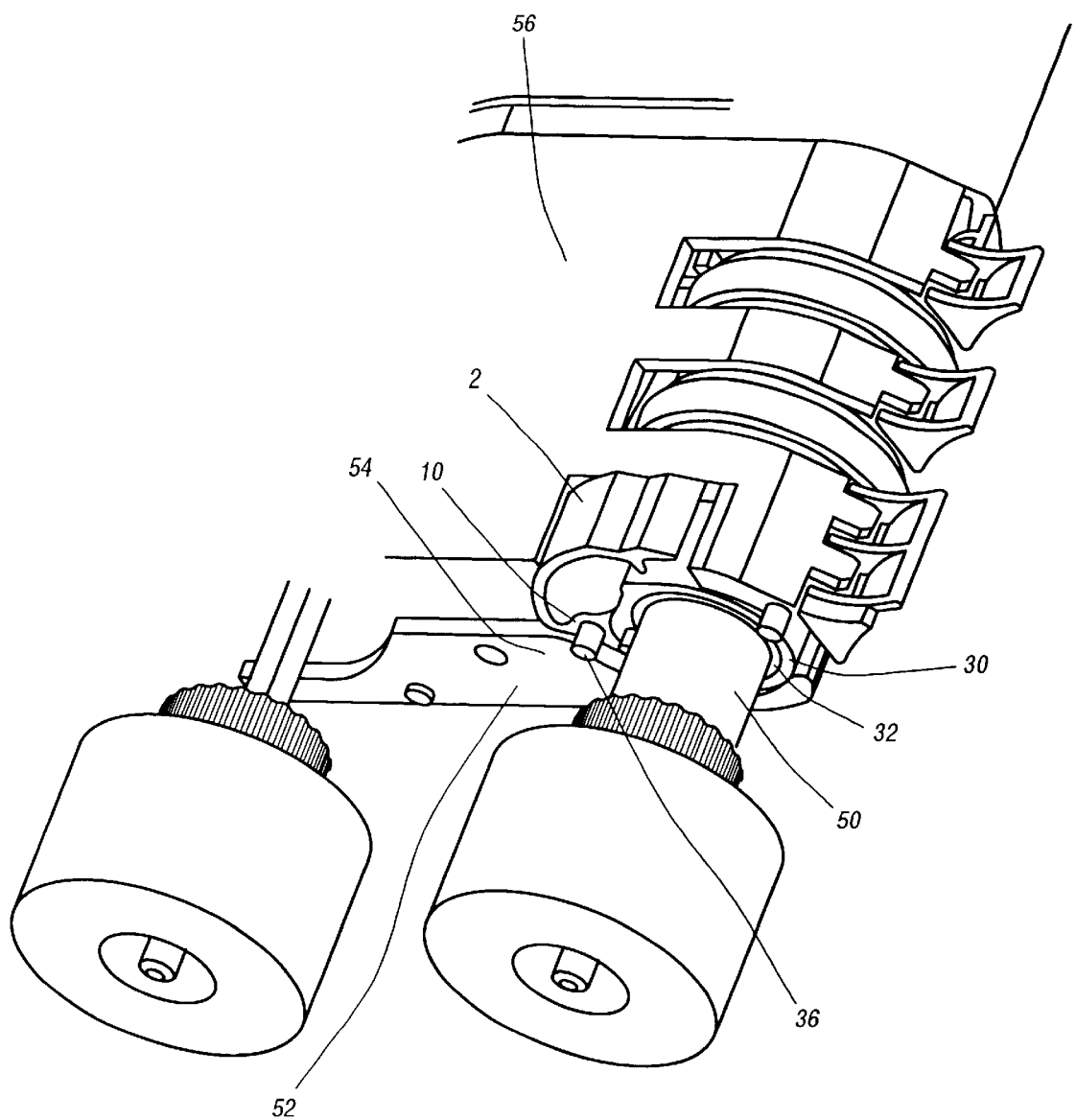
FIG. 5 is an elevational view showing the head pressure device of the present invention in a magnetic read machine.

FIG. 5 shows head pressure device 2 in a character reading machine 56. Cylindrical housing 30 is formed so inner circumference 32 may fit around shaft 50. Protruding pin support 36 stationarily extends from beam arm 10 and is formed to interface with notch 54 of support arm 52 to prevent rotation of head pressure device 2 about shaft 50.

The invention claimed is:

1. A magnetically coded substrate positioning apparatus comprising:
   a housing;
   a beam arm having a first end attached to said housing; and
   a contact head connected to a second end of said beam arm, said contact head having an outer extremity and an inner extremity having a recessed wedge formed by a lead-in and a lead-out contacting a substrate in a first location and second location, respectively, said lead-in and said lead-out delivering desired forces to said substrate causing said substrate located between said lead-in and lead-out to continuously contact an apex of a read head for a short distance before and after an active reading area of said read head.

2. The magnetically coded substrate positioning apparatus according to claim 1, wherein said housing is cylindrical.

3. The magnetically coded substrate positioning apparatus according to claim 1, wherein said magnetically coded substrate positioning apparatus is formed as a single piece.

4. The magnetically coded substrate positioning apparatus according to claim 1, wherein said beam arm has a pin adapted for engagement with a notch of a character reading machine for preventing rotational movement of said housing.

5. The magnetically coded substrate positioning apparatus according to claim 1, wherein said recessed wedge has a substantially v-shaped cross-section.

6. The magnetically coated substrate positioning apparatus according to claim 1, wherein said lead-in and said lead-out deform the substrate at approximately a four degree included angle about the apex of the read head.

* * * * *